United States Patent Office.

A. M. TODD AND J. P. TODD, OF DES MOINES, IOWA.

IMPROVED COMPOSITION LETTER FOR SIGNS, &c.

Specification forming part of Letters Patent No. 93,924, dated August 17, 1869.

*To all whom it may concern:*

Be it known that we, A. M. TODD and J. P. TODD, of Des Moines, in the county of Polk, and in the State of Iowa, have invented certain new and useful Improvements in Mode of Making Letters for Signs, &c.; and we do hereby declare that the following is a full, clear, and exact description thereof.

The nature of our invention consists in the manufacture of raised letters from earthenware, concrete, and plastic material, whereby we obtain smooth and indestructible letters, which can be gilded to represent solid raised gold letters.

In order to enable others skilled in the art to which our invention appertains to make and use the same, we will now proceed to describe the manner in which the same is or may be constructed.

To make pottery or stone ware letters, we mold them of clay in molds made of plaster-of-paris, and when sufficiently dry burn them in a kiln in the same manner that pottery-ware or brick are burned. The gilding or coloring may be put on either before or after burning.

We use molds made of plaster-of-paris, because it absorbs the moisture from the clay, causing it to shrink and separate from the mold. Other materials may be used for molds; but we prefer plaster-of-paris.

If the letters are made of plaster-of-paris, we do not burn them, but simply mold them, and after being thoroughly dried we coat them with a water-proof coating—common paint and oil, gum-shellac, water-proof glue, or anything that will exclude the water.

Having thus fully described our invention, what we claim as new, and desire to secure by Letters Patent, is—

1. The within-described mode of manufacturing letters from earthenware, concrete, or plastic material, substantially as specified.

2. As a new article of manufacture, letters made of earthenware, concrete, or plastic material, substantially as set forth.

In testimony that we claim the foregoing we have hereunto set our hands this 29th day of June, 1869.

A. M. TODD.
J. P. TODD.

Witnesses:
WM. PHILLIPS,
J. M. ST. JOHN.